United States Patent [19]
Pierro

[11] 3,939,986
[45] Feb. 24, 1976

[54] ADJUSTABLE SUPPORT MEANS

[76] Inventor: Joseph W. Pierro, 119 Unkament Drive, Pittsfield, Mass. 01201

[22] Filed: Nov. 4, 1974

[21] Appl. No.: 520,540

[52] U.S. Cl................... 211/74; 248/226 B; 108/44
[51] Int. Cl.[2]................... A47B 73/00; A47B 23/00
[58] Field of Search................... 211/74, 105.3, 175; 108/44, 45, 46, 47; 24/206; 403/363, 353, 331, 393; 248/226 B, 226 D

[56] References Cited
UNITED STATES PATENTS

| | | | |
|---|---|---|---|
| 1,760,346 | 5/1930 | Correa | 248/226 B |
| 1,788,800 | 1/1931 | McGinley | 108/46 |
| 2,517,927 | 8/1950 | Reed | 248/226 B |
| 2,862,435 | 12/1958 | Buchenberger et al. | 248/226 B |
| 2,867,401 | 1/1959 | Sheahan | 108/47 |
| 3,120,308 | 2/1964 | Pierro | 211/74 |

Primary Examiner—Roy D. Frazier
Assistant Examiner—Robert A. Hafer

[57] ABSTRACT

An adjustable support means including a pair of cooperating members. A first member has a tray type device and a horizontal arm including locking means and a vertical arm with a foam pad. A second member has a pair of slotlike extensions on a horizontal arm which engages the sides of the horizontal arm of the first member and coacts with the locking means. The second member also has a vertical member with a foam pad to coat with the first vertical arm to lock on a supporting structure.

5 Claims, 5 Drawing Figures

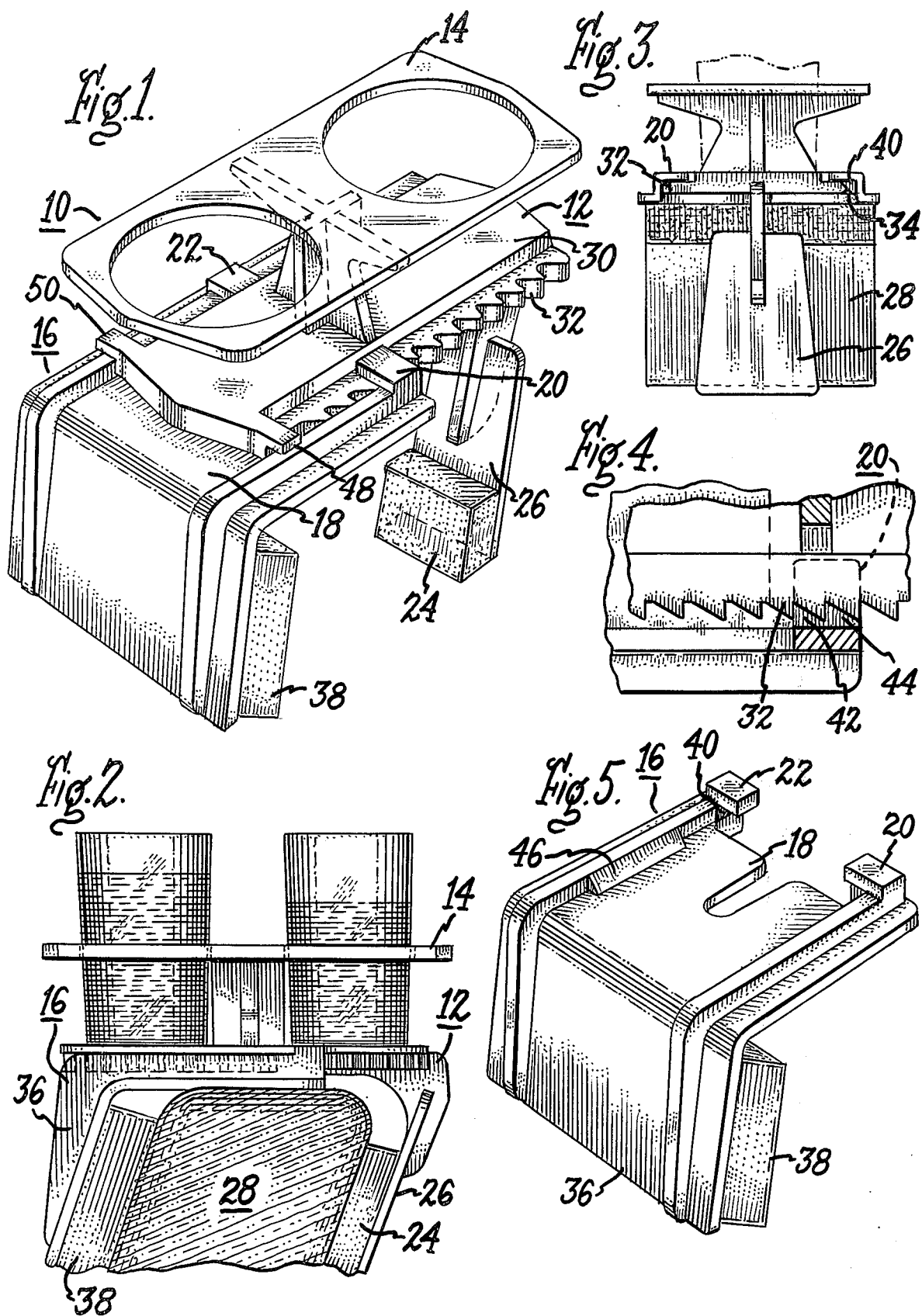

ADJUSTABLE SUPPORT MEANS

BACKGROUND OF THE INVENTION

This invention rleates to an adjustable support means, and more particularly, to an adjustable support means for supporting a tray or similar device on the arm or back of upholstered furniture, such as a sofa, chair or a car seat.

As is well known to those skilled in this art, many attempts have been made to provide an adjustable support means for use with trays and similar devices. These supports means have been desired so as to firmly position or otherwise secure a tray or similar device to the arm of a chair or sofa or to the back of a car seat. Such support means have been found necessary in today's society due to the great amount of auto travel, informal entertaining and television viewing done by the American public. In each of these activities it is found desirable to partake of food or drink during the course of an evening, or at some point during travel. When food or drink is served a problem generally arises for the guests and hosts alike as to a suitable place to rest the containers of food or drink while they are being consumed.

The invention set forth herein is an improvement over the adjustable support means described and claimed in U.S. Pat. No. 3,120,308, issued Feb. 4, 1964 to the same inventor as in this invention.

It is, therefore, a principal object of this invention to provide a novel support means that is readily adjustable to enable it to be secured to a variety of supporting structures and which will resist accidental dislodgment.

A further object of this invention is to provide a novel, adjustable support means having cooperating parts which function together to lock the support means to any of a variety of supporting structures.

A still further object of this invention is to provide a novel, adjustable support means having cooperating parts which are provided with a novel locking means which requires a specific downward movement to release, thereby preventing accidental release or dislodgment of the support means.

SUMMARY OF THE INVENTION

In carrying out this invention in one form thereof, an adjustable support means is provided which comprises first and second cooperating members. A first member has a tray or similar device secured thereto and is provided with a lock means, forming a part of said first member. The second member is provided with a pair of slot-like extensions which engage the sides of the first member in a sliding engagement. One of the slot-like extensions is provided with tooth-like parts while the other extension has a beveled part such that when the members are in sliding engagement the toothlike parts are forced into locking position with the locking means to firmly secure the support means to a supporting structure.

The invention which is sought to be protected is clearly pointed out and distinctly claimed in the claims appended hereto. However, it is believed that the construction and operation of this invention, and the manner in which its various objects and advantages are achieved, together with other objects and advantages thereof, will be better understood from the following detailed description, when taken in the light of the accompanying drawings.

BRIEF DESCRIPTION OF DRAWINGS

FIG. 1 is a perspective view of a preferred embodiment of this invention;

FIG. 2 is an elevation view showing the preferred form of this invention in use;

FIG. 3 is a side view of FIG. 2;

FIG. 4 is a detail partial view showing the preferred locking means; and

FIG. 5 is a perspective view of one of the members of the adjustable support means of this invention.

DESCRIPTION OF PREFERRED EMBODIMENT

Referring now to the drawings, in which like numerals are used to indicate like parts throughout the various views thereof, this invention is shown in a preferred embodiment as an adjustable support means 10, comprising a first member 12 having a tray device, shown in the form of a tumbler or cup holder 14, secured thereto. A second member 16 is provided having an arm 18 forming a part thereof. Arm 18 is provided with slot-like extensions 20 and 22 which slidingly engage the sides of member 12. The slot-like extensions 20 and 22 coact with the sides of member 12 to provide an adjustable, locking engagement between members 12 and 16, as will be more fully described.

Considering now FIGS. 1 and 2, the adjustable support means 10 is shown as comprising a substantially L-shaped member 12 having a gripping part in the form of a foam pad 24 secured to the lower or vertical arm 26 of the L-shaped member 12. As shown in FIG. 2, gripping pad 24 contacts one side of an upholstered furniture piece 28, such as the seat back or arm rest of an automobile. Of course, it will be understood that other forms of gripping means may be used, such as the rod form shown in patent 3,120,308. The upper or horizontal arm 30 of member 12 is provided with locking means in the form of teeth 32 along one side thereof, as best shown in FIG. 1. The opposite side of arm 30 is beveled, as shown at 34 in FIG. 3.

The second member 16 of the adjustable support means 10 is also substantially L-shaped, having the upper or horizontal arm 18 and a lower or vertical arm 36. As shown, lower arm 36 is provided with a gripping member in the form of foam pad 38, similar to foam pad 24. Arm 18 is provided with slot-like extensions 20, 22, which coact with sides of arm 30 of member 12 to provide an adjustable locking of the support means 10. As can best be seen in FIGS. 3 and 5, the slot-like extension 22 of arm 18 is provided with a cam part 40 which cooperates with the beveled side 34 of arm 30. The slot-like extension 20 is provided with projections 42, 44 which cooperate with teeth 32 of arm 30 to lock members 12 and 16 together as is best shown in FIG. 4. The side of arm 18 having cam 40 may also be provided with a second cam 46, sloped oppositely to cam 40, as shown in FIG. 5, which will also cooperate with beveled side 34 of arm 30.

In the preferred embodiment, the horizontal portion 30 of first member 12 is provided with a pair of lugs 48,50 at one end thereof, as shown in FIG. 1. These lugs, 48,50 cooperate with the slot-like extensions 20,22 to prevent member 16 from sliding off of member 12 in one direction, as is apparent in FIG. 1. Thus, member 16 may only be engaged or disengaged from member 12 at the intersection of arms 30 and 26.

From the above description it is believed that the operation of the adjustable support means of this invention will readily be understood. As will be apparent, the member 16 is slidingly engaged with member 12, by hooking the slot-like extensions 20, 22 over the sides of arm 30. While held at a slight angle to the horizontal, member 16 may be moved along member 30, until the distance between pads 24 and 38 is sufficient to fit over the back of an object, such as a seat back 28. The adjustable support means 10 is then placed over the back, as shown in FIG. 2. Then by slight pressure on arms 26 and 36, the pads 24 and 38 may be moved into engagement with the opposite sides of the seat back 28, compressing the pads 24 and 38. When the pressure is released the pads will move arms 18 and 30 into a horizontal position, causing cam 40, and 46, if present, to act on beveled side 34 of arm 30, causing projections 42, 44 to mesh with teeth 32 firmly locking members 12 and 16 to the back 28. Obviously, the support means 10 may be removed by compressing pads 24, 38 to allow movement of arm 18 away from the horizontal, thus, disengaging projections 42, 44 from teeth 32, and then sliding the members 12 and 16 to separate arms 26 and 36. It will also be apparent that support means 10 may be removed by merely sliding pads 38, 24 upwardly over seat back 28.

While there has been shown and described the present preferred embodiment of the invention, it will be apparent to those skilled in the art that various changes may be made in the details thereof. It will be clear to those skilled in the art that all such changes are contemplated herein as fall within the spirit and scope of the invention as it is defined in the appended claims.

What I claim as new and which it is desired to secure by Letters Patent of the United States is:

1. An adjustable support means for supporting a tray-like device on a portion of upholstered furniture comprising:
   a. a first member including a tray-like device,
      1. an arm portion of said first member having sides, one of said sides having a plurality of teeth formed therein and the other of said sides being beveled,
   b. a second member movable into locking engagement with said first member,
      1. said second member having a pair of slot-like extensions for sliding engagement with said sides of said first member,
         a. one of said slot-like extensions having a cam means coacting with said beveled side of said first member,
         b. the other of said slot-like extensions having at least one projection coacting with said teeth on said first member,
   whereby as said second member engages said first member said cam means coacts with said beveled side to move said teeth into locking engagement with said at least one projection.

2. An adjustable support means as claimed in claim 1 in which each of said members is an L-shaped member, the horizontal arm of said first member having said plurality of teeth and the horizontal arm of said second member having said pair of slot-like extensions, and the vertical arm of each of said members is provided with gripping means to secure said adjustable support means to a supporting structure.

3. An adjustable support means as claimed in claim 2 in which said gripping means are in the form of foam pads.

4. An adjustable support means as claimed in claim 1 in which said first member has a vertical cam portion connected to said arm portion having said plurality of teeth, said vertical arm portion having a gripping means to secure said adjustable support device to a supporting structure.

5. An adjustable support means as claimed in claim 1 in which said arm portion of said first member has a pair of lugs which cooperate with said slot-like extensions of said second member to prevent disengagement of said first and second members in one direction.

* * * * *